United States Patent
Lo

(10) Patent No.: US 10,067,602 B1
(45) Date of Patent: Sep. 4, 2018

(54) TOUCH PANEL AND METHOD OF MANUFACTURING THE SAME

(71) Applicant: LITEMAX ELECTRONICS INC., New Taipei (TW)

(72) Inventor: Jung-Chi Lo, New Taipei (TW)

(73) Assignee: LITEMAX ELECTRONICS INC. (TW)

( * ) Notice: Subject to any disclaimer, the term of this patent is extended or adjusted under 35 U.S.C. 154(b) by 0 days.

(21) Appl. No.: 15/584,070

(22) Filed: May 2, 2017

(51) Int. Cl.
*H05K 3/00* (2006.01)
*G06F 3/041* (2006.01)

(52) U.S. Cl.
CPC .. *G06F 3/0416* (2013.01); *G06F 2203/04103* (2013.01)

(58) Field of Classification Search
None
See application file for complete search history.

(56) References Cited

U.S. PATENT DOCUMENTS

| | | | |
|---|---|---|---|
| 4,290,052 A * | 9/1981 | Eichelberger | G06F 3/044 341/33 |
| 9,735,222 B2 * | 8/2017 | Nishido | H01L 27/3276 |
| 2015/0346880 A1 * | 12/2015 | Xiao | G06F 3/044 345/173 |
| 2015/0371076 A1 * | 12/2015 | Lee | G06F 3/041 382/124 |

* cited by examiner

*Primary Examiner* — Shamim Ahmed
(74) *Attorney, Agent, or Firm* — Schmeiser, Olsen & Watts, LLP

(57) ABSTRACT

A touch panel includes a substrate having a breaking section, a touch surface, and a back opposing the touch surface; an adhesive layer disposed on the back; an electrode layer having a cutting section and connected to the back through the adhesive layer; an insulating cement for covering the breaking section and the cutting section and filling a gap between the substrate and the electrode layer; and a control chip connecting with the electrode layer and exercising control over the electrode layer. Hence, the touch panel has special sizes, dispensing with the need for customization which is otherwise to be performed by touch panel suppliers to the detriment of time efficiency, manpower efficiency, cost control, and uses.

5 Claims, 6 Drawing Sheets

TOUCH PANEL AND METHOD OF MANUFACTURING THE SAME

FIELD OF THE INVENTION

The present invention relates to touch panels and methods of manufacturing the same and, more particularly, to a touch panel which can be cut to take on different specific sizes by a convenient process and a method of manufacturing the same.

BACKGROUND OF THE INVENTION

Due to technological advances, touch panels are in wide use with various display devices to substitute for input components, such as keyboards and mouses, connected to the display devices, so as to enhance ease of use.

Conventional touch panels, for example, fall into categories as follows: resistive touch panels, photosensitive touch panels, and capacitive touch panels. When a user touches, with a finger or an object, a display device equipped with a touch panel, the display device can, for example, sense an electrostatic capacitance change produced as a result of associating a conductive induction pattern with another conductive induction pattern or a ground electrode and thus convert the contact position at which the user's finger or object and the touch panel come into contact with each other into an electrical signal, starting a related function of the display device.

However, a conventional touch panel supplier is able to supply touch panels with specific sizes and specific aspect ratios only. For instance, typical sizes of display units which come with conventional desktop computers are: 21 inches, 24 inches, 27 inches, and 32 inches. Similarly, typical sizes of the screens of smartphones are: 4.7 inches, 5 inches, and 5.5 inches. The display units and screens usually have aspect ratios of 4:3 and 16:9. As a result, the aforesaid specific sizes and specific aspect ratios of conventional touch panels supplied by suppliers constitute a limit placed on specific uses of the touch panels, for example, functioning as traffic sign displays, interactive advertising boards, and elevator control panels.

Although it is a possible option, customization of conventional touch panels has its disadvantages: die development takes months and is pricey; and customized touch panels have so few customers that they must be sold expensively in order to be profitable.

SUMMARY OF THE INVENTION

It is an objective of the present invention to provide a touch panel which can be cut to take on different specific sizes by a convenient process and a method of manufacturing the same, thereby dispensing with the need for customization which is otherwise to be performed by touch panel suppliers to the detriment of time efficiency, manpower efficiency, cost control, and uses.

In order to achieve the above and other objectives, the present invention provides a touch panel, comprising: a substrate having a breaking section, a touch surface, and a back opposing the touch surface; an adhesive layer disposed on the back; an electrode layer having a cutting section and connected to the back through the adhesive layer; an insulating cement for covering the breaking section and the cutting section and filling a gap between the substrate and the electrode layer; and a control chip connecting with the electrode layer and exercising control over the electrode layer.

In an embodiment of the present invention, the control chip is connected to the electrode layer through a plurality of flexible flat cables.

In an embodiment of the present invention, the touch panel further comprises a transmission connection component connected to the control chip.

In an embodiment of the present invention, the touch surface has a display region and a non-display region, with the non-display region disposed outside the display region to enclose the display region, and the touch panel further comprises a frame disposed on the non-display region.

In an embodiment of the present invention, the electrode layer is made of indium tin oxide.

In order to achieve the above and other objectives, the present invention further provides a method of manufacturing a touch panel, comprising the steps of: providing a touch panel blank which comprises: a substrate having a touch surface and a back opposing the touch surface; an adhesive layer disposed on the back; an electrode layer connected to the back through the adhesive layer; and a control chip connecting with the electrode layer and exercising control over the electrode layer; a cutting step for cutting the electrode layer at a point corresponding in position to a default location to trim the electrode layer so that a remaining portion of the electrode layer has a cutting section, and reveal a portion of the adhesive layer, wherein the control chip is connected to the remaining portion of the electrode layer; a cleaning step for removing the revealed portion of the adhesive layer with a detergent; a cracking step for cracking the substrate at a point corresponding in position to the default location and then removing a portion of the substrate so that a remaining portion of the substrate has a breaking section; and a filling step for covering the breaking section and the cutting section with an insulating cement and filling a gap between the remaining portion of the substrate and the remaining portion of the electrode layer with the insulating cement.

In an embodiment of the present invention, the cracking step is preceded by an aligning step which involves forming a cut line on the substrate at a point corresponding in position to the default location with a cutter, and the cracking step involves cracking the substrate along the cut line.

In an embodiment of the present invention, the control chip is connected to the remaining portion of the electrode layer through a plurality of flexible flat cables.

In an embodiment of the present invention, the touch panel blank further comprises a transmission connection component connected to the control chip.

In an embodiment of the present invention, a touch surface of the remaining portion of the substrate has a display region and a non-display region, with the non-display region disposed outside the display region to enclose the display region, and the method further comprises a concealing step whereby a frame is disposed on the non-display region.

Hence, according to the present invention, a touch panel blank provided by touch panel suppliers can be cut by a convenient manufacturing process to form a touch panel with different special sizes and aspect ratios, thereby dispensing with the need for customization which is otherwise to be performed by touch panel suppliers to the detriment of time efficiency, manpower efficiency, cost control, and uses.

DETAILED DESCRIPTION OF THE PREFERRED EMBODIMENTS

To enable persons skilled in the art to fully understand the objectives, features, and advantages of the present invention, the present invention is illustrated with specific embodiments, depicted by the accompanying drawings, and described hereunder. The present invention can be implemented or applied by any other embodiments. Changes and modifications may be made by persons skilled in the art to the preferred embodiments in accordance with different viewpoints and applications without departing from the spirit of the present invention. Moreover, the accompanying drawings of the present invention are not drawn to scale, as they are just intended to serve an illustrative purpose. Features of the present invention are described in detail below, but the features thus described are not restrictive of the scope of the present invention.

Figure 1:
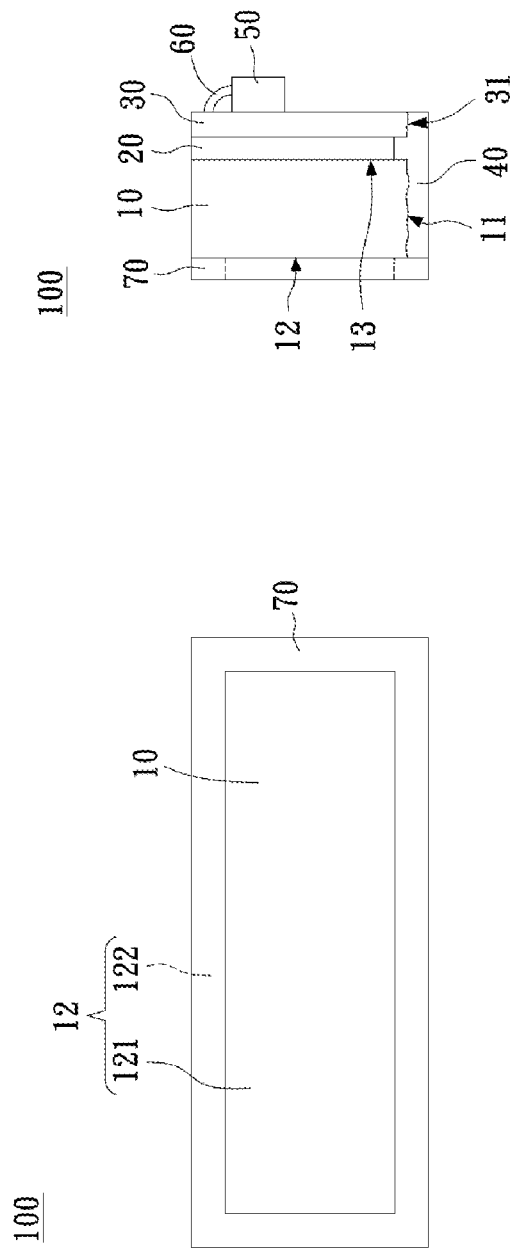
FIG. 1A is a front view of a touch panel according to an embodiment of the present invention.
FIG. 1B is a lateral view of the touch panel according to the embodiment of the present invention.

FIG. 1A is a front view of a touch panel 100 according to an embodiment of the present invention. FIG. 1B is a lateral view of the touch panel 100 according to the embodiment of the present invention. Referring to FIGS. 1A, 1B, the touch panel 100 comprises a substrate 10, an adhesive layer 20, an electrode layer 30, an insulating cement 40 and a control chip 50. The substrate 10 has a breaking section 11, a touch surface 12, and a back 13 opposing the touch surface 12. The adhesive layer 20 is disposed on the back 13 of the substrate 10. The electrode layer 30 has a cutting section 31. The electrode layer 30 is connected to the back 13 through the adhesive layer 20. The insulating cement 40 covers the breaking section 11 and the cutting section 31 and fills a gap between the substrate 10 and the electrode layer 30. The control chip 50 connects with the electrode layer 30 to exercise control over the electrode layer 30.

In this embodiment, the substrate 10 is, for example, a glass substrate. The electrode layer 30 is made of, for example, indium tin oxide (ITO). The control chip 50 is connected to the electrode layer 30 through a plurality of flexible flat cables (FFC) 60 to control a plurality of circuit patterns (not shown) on the electrode layer 30. The touch panel 100 further comprises a transmission connection component (not shown). The transmission connection component is connected to the control chip 50. For instance, the transmission connection component is a universal serial bus (USB) component.

Referring to FIG. 1A, the touch surface 12 of the substrate 10 has a display region 121 and a non-display region 122. The non-display region 122 is disposed outside the display region 121 to enclose the display region 121. The user touches the display region 121 with a finger or object. The touch panel 100 further comprises a frame 70. The frame 70 is disposed on the non-display region 122.

In an embodiment of the present invention, the touch panel 100 is applicable to traffic sign displays, interactive advertising boards, and elevator control panels, which require that an applicable touch panel should have special sizes. In an embodiment of the present invention, the touch panel 100 does not necessitate customization which is otherwise to be carried out by touch panel suppliers.

Figure 2:
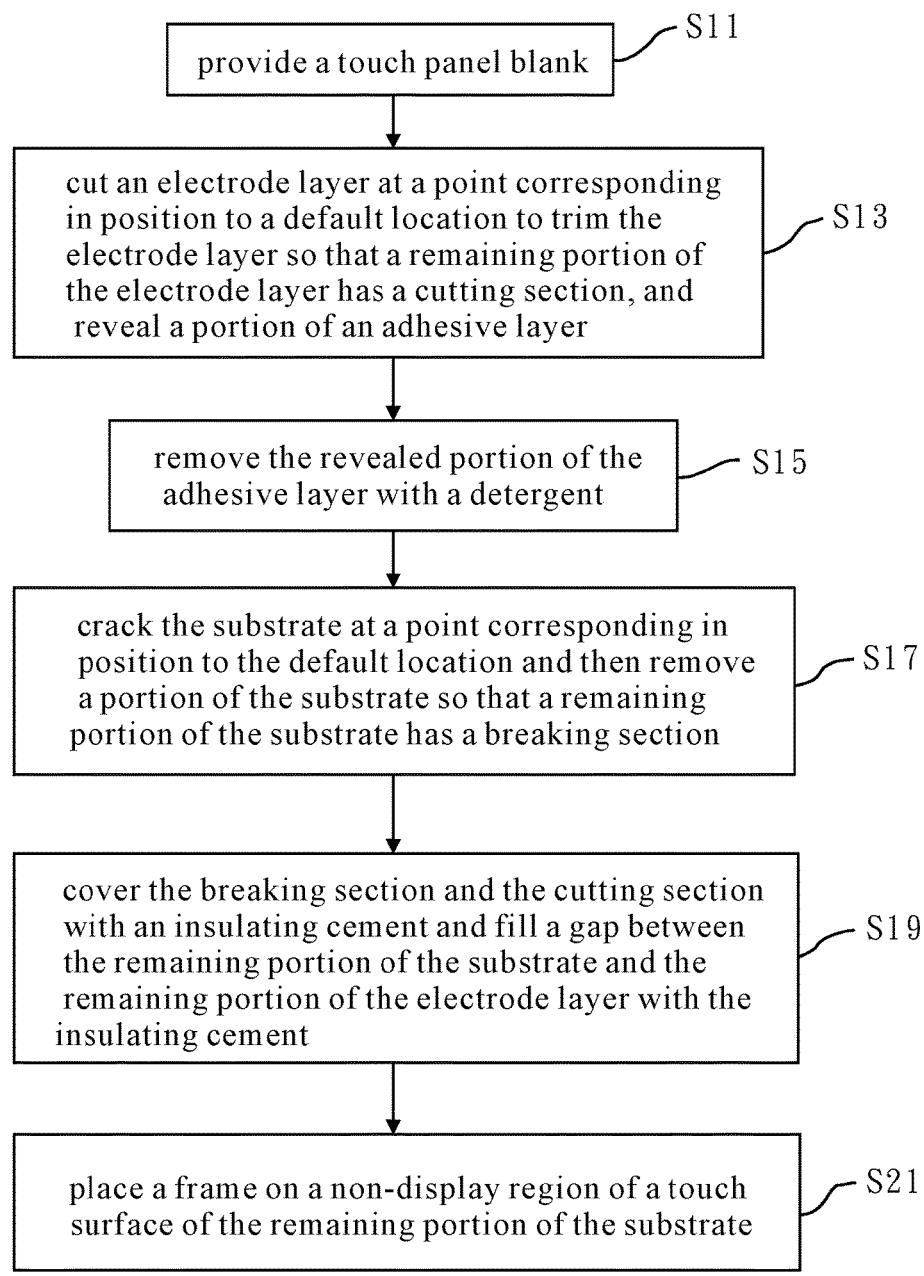
FIG. 2 is a schematic view of the process flow of a method of manufacturing the touch panel according to an embodiment of the present invention.

FIG. 2 is a schematic view of the process flow of a method of manufacturing the touch panel 100 according to an embodiment of the present invention. FIG. 3A~FIG. 3E are schematic views of stages of the manufacturing process of the touch panel 100 being manufactured according to the embodiment of the present invention. For illustrative sake, FIG. 3A~FIG. 3E are front views and lateral views of the touch panel 100 in respective stages.

Figure 3A:
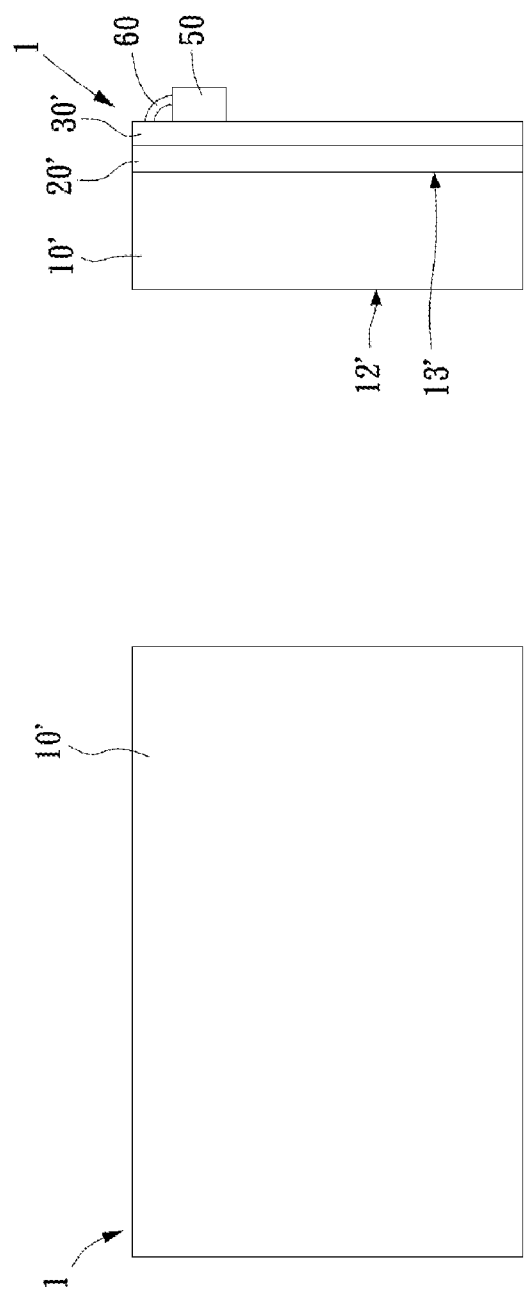
FIG. 3A~FIG. 3E are schematic views of stages of the manufacturing process of the touch panel being manufactured according to the embodiment of the present invention.

Referring to FIG. 2 and FIG. 3A, step S11 involves providing a touch panel blank 1. The touch panel blank 1 is provided by a conventional touch panel supplier and has a typical size. The touch panel blank 1 comprises a substrate 10', an adhesive layer 20', an electrode layer 30' and a control chip 50. The substrate 10' has a touch surface 12' and a back 13' opposing the touch surface 12'. The adhesive layer 20' is disposed on the back 13' of the substrate 10'. The electrode layer 30' is connected to the back 13' through the adhesive layer 20'. The control chip 50 connects with the electrode layer 30' and exercises control over the electrode layer 30'. The control chip 50 is connected to the electrode layer 30 through a plurality of flexible flat cables (FFC) 60. The touch panel blank 1 further comprises a transmission connection component (not shown). The transmission connection component is connected to the control chip 50.

Figure 3B:
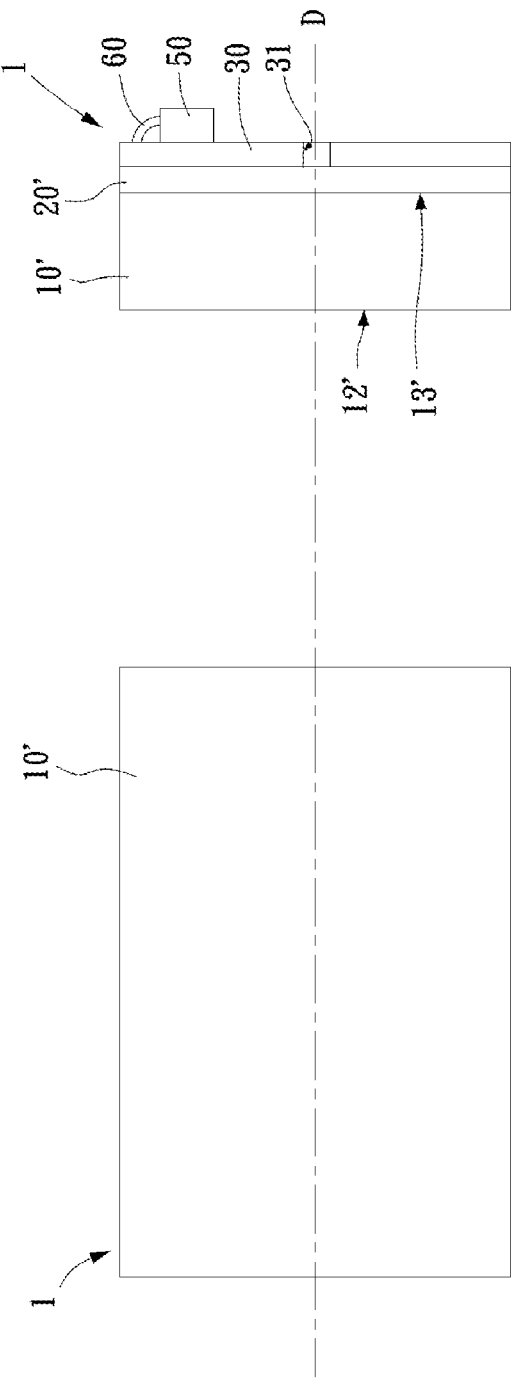

Referring to FIG. 2 and FIG. 3B, step S13 is a cutting step. In the cutting step, a cutting process is performed at a default location D to trim the electrode layer 30' so that the remaining portion of the electrode layer 30 has a cutting section 31 and reveals a portion of the adhesive layer 20'. In this embodiment, the control chip 50 is still connected to the trimmed electrode layer 30' through the plurality of flexible flat cables 60.

Figure 3C:
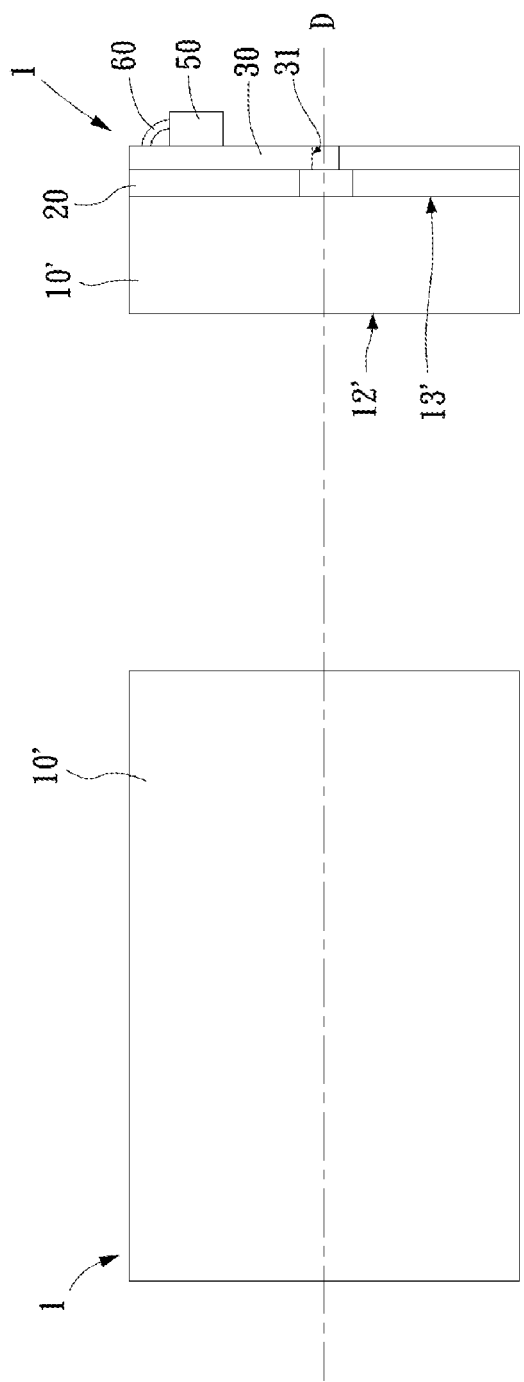

Referring to FIG. 2 and FIG. 3C, step S15 is a cleaning step. In the cleaning step, a detergent removes the revealed portion of the adhesive layer 20'. In an embodiment, the detergent, for example, is a solvent dedicated to removing smears or adhesive. The adhesive layer is denoted by 20 in FIG. 3C.

Figure 3D:
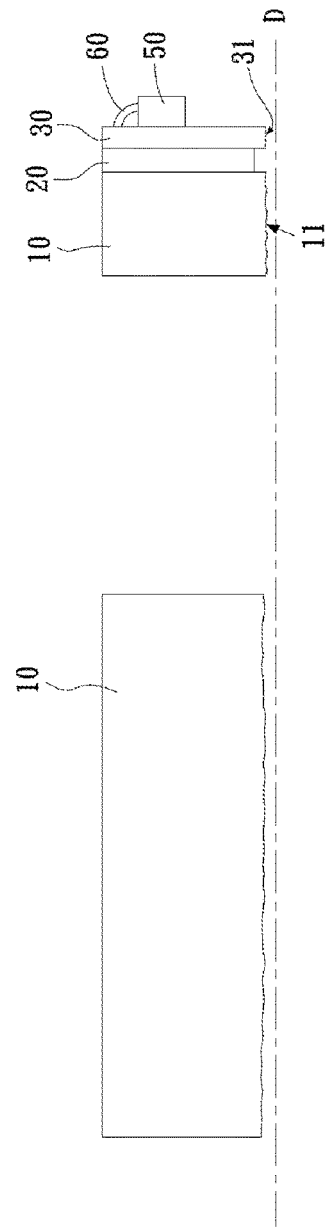

Referring to FIG. 2 and FIG. 3D, step S17 is a cracking step which involves cracking the substrate 10' at a point corresponding in position to the default location D and then removing a portion of the substrate 10' (together with a portion of the adhesive layer 20' and a portion of the electrode layer 30') so that the remaining portion of the substrate 10 has a breaking section 11.

In an embodiment, step S17, i.e., the cracking step, is preceded by an aligning step. The aligning step involves forming a cut line on the substrate 10' at a point corresponding in position to the default location D with a cutter. Then, the cracking step involves cracking the substrate 10' along the cut line, so as to crack the substrate 10'.

Step S13~step S17 deal with the electrode layer 30', adhesive layer 20' and substrate 10' of the touch panel blank 1 separately rather than simultaneously, because cutting the electrode layer 30', adhesive layer 20' and substrate 10' leads to retention of adhesive, contamination of the electrode layer 30 and the substrate 10, thereby reducing the yield. Hence, step S13~step S17 effectively prevent retention of adhesive, contamination of the electrode layer 30 and the substrate 10, and reduction in the yield.

Figure 3E:
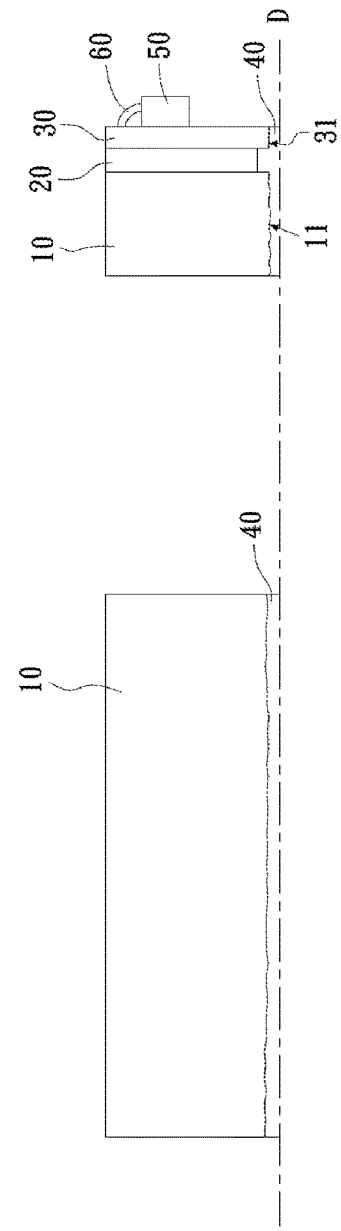

Referring to FIG. 2 and FIG. 3E, step S19 is a filling step. The filling step involves covering the breaking section 11 and the cutting section 31 with an insulating cement 40 and filling a gap between the remaining portion of the substrate 10 and the remaining portion of the electrode layer 30 with the insulating cement 40.

Referring to FIG. 2, step S21 is a concealing step. Upon completion of the concealing step, the touch panel 100 shown in FIG. 1A and FIG. 1B is finalized. Referring to FIG. 1A and FIG. 1B, the touch surface 12 of the remaining portion of the substrate 10 has a display region 121 and a non-display region 122, wherein the non-display region 122 is disposed outside the display region 121 to enclose the display region 121. In the concealing step, the frame 70 is disposed on the non-display region 122.

With the manufacturing method of the present invention, the touch panel blank 1 provided by a conventional touch panel supplier and characterized by a typical size and specific aspect ratio turns into the touch panel 100 which has a special size and aspect ratio to therefore dispense with the need for customization but become readily applicable.

For instance, as shown in FIG. 3B~FIG. 3D, if the default location D is centrally located to divide the width of the touch panel blank 1 (32 inches in size, aspect ratio of 16:9) into two halves, the touch panel blank 1 can be cut to form the touch panel 100 which is 29 inches in size and has an aspect ratio of 32:9. As shown in the diagrams, if the default location D is located in a biased manner to divide the width of the touch panel blank 1 (32 inches in size, aspect ratio of 16:9) into two unequal portions of the width so that one portion is two times greater than the other portion, the touch panel blank 1 can be cut to form the touch panel 100 which is 28 inches in size and has an aspect ratio of 16:3.

Hence, the touch panel 100 provided by the present invention can be cut by a convenient manufacturing process to take on different special sizes and aspect ratios, thereby dispensing with the need for customization which is otherwise to be performed by touch panel suppliers to the detriment of time efficiency, manpower efficiency, cost control, and uses.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A method of manufacturing a touch panel, comprising:
a step of providing a touch panel blank which comprises:
   a substrate having a touch surface and a back opposing the touch surface;
   an adhesive layer disposed on the back;
   an electrode layer connected to the back through the adhesive layer; and
   a control chip connecting with the electrode layer and exercising control over the electrode layer;
a cutting step for cutting the electrode layer at a point corresponding in position to a default location to trim the electrode layer so that a remaining portion of the electrode layer has a cutting section, and reveal a portion of the adhesive layer, wherein the control chip is connected to the remaining portion of the electrode layer;
a cleaning step for removing the revealed portion of the adhesive layer with a detergent;
a cracking step for cracking the substrate at a point corresponding in position to the default location and then removing a portion of the substrate so that a remaining portion of the substrate has a breaking section; and
a filling step for covering the breaking section and the cutting section with an insulating cement and filling a gap between the remaining portion of the substrate and the remaining portion of the electrode layer with the insulating cement.

2. The method of claim 1, wherein the cracking step is preceded by an aligning step which involves forming a cut line on the substrate at a point corresponding in position to the default location with a cutter, and the cracking step involves cracking the substrate along the cut line.

3. The method of claim 1, wherein the control chip is connected to the remaining portion of the electrode layer through a plurality of flexible flat cables.

4. The method of claim 1, wherein the touch panel blank further comprises a transmission connection component connected to the control chip.

5. The method of claim 1, further comprising a concealing step, wherein a touch surface of the remaining portion of the substrate has a display region and a non-display region, with the non-display region disposed outside the display region to enclose the display region, and a frame is disposed on the non-display region by the concealing step.

* * * * *